United States Patent
Adachi

(10) Patent No.: US 9,989,062 B2
(45) Date of Patent: Jun. 5, 2018

(54) FAN MOTOR LEAD WIRE PROTECTION MEMBER

(71) Applicant: Nidec Corporation, Kyoto (JP)

(72) Inventor: Masaki Adachi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 487 days.

(21) Appl. No.: 14/576,742

(22) Filed: Dec. 19, 2014

(65) Prior Publication Data

US 2015/0226225 A1 Aug. 13, 2015

(30) Foreign Application Priority Data

Feb. 8, 2014 (CN) .......................... 2014 1 0045507

(51) Int. Cl.
| | |
|---|---|
| *F04D 19/00* | (2006.01) |
| *F04D 25/06* | (2006.01) |
| *F04D 29/52* | (2006.01) |
| *H02K 5/16* | (2006.01) |

(52) U.S. Cl.
CPC ....... *F04D 19/002* (2013.01); *F04D 25/0613* (2013.01); *F04D 25/0693* (2013.01); *F04D 29/522* (2013.01); *H02K 5/16* (2013.01)

(58) Field of Classification Search
CPC .. F04D 19/002; F04D 29/522; F04D 29/0693; F04D 29/0613; F04D 25/062; F04D 25/0693; F04D 25/08; F04D 29/403; F04D 29/54; F04D 29/541; H02K 1/14; H02K 1/16; H02K 1/27; H02K 3/18; H02K 3/38; H02K 5/16; H02K 5/173; H02K 11/00; H02K 11/30; H02K 11/33

USPC .................................... 417/423.12, 354
See application file for complete search history.

(56) References Cited

U.S. PATENT DOCUMENTS

| | | | | |
|---|---|---|---|---|
| 4,686,400 A | * | 8/1987 | Fujisaki | ................. H02K 29/08 310/156.05 |
| 5,193,983 A | * | 3/1993 | Shyu | ..................... F04D 29/384 416/236 A |
| 5,214,331 A | * | 5/1993 | Nishimura | ......... G11B 19/2009 310/67 R |

(Continued)

FOREIGN PATENT DOCUMENTS

| | | |
|---|---|---|
| CN | 202889059 U | 4/2013 |
| JP | 2009-050136 A | 3/2009 |
| JP | 2010-074999 A | 4/2010 |

*Primary Examiner* — Peter J Bertheaud
*Assistant Examiner* — Joseph Herrmann
(74) *Attorney, Agent, or Firm* — Keating & Bennett, LLP

(57) ABSTRACT

A fan motor includes a stationary portion, a rotary portion, and an impeller. The rotary portion is configured to rotate about a center axis with respect to the stationary portion through a bearing mechanism. The impeller is configured to rotate together with the rotary portion. The stationary portion includes an armature including a coil positioned around the center axis, a metal base plate arranged below the armature, and a circuit board located above or below the base plate and provided with a lead wire electrically connected to the outside. The base plate and the lead wire are isolated from each other by a protection member. By installing the protection member between the metal base plate and the lead wire, the lead wire is prevented from making direct contact with the inner peripheral edge of the metal base plate.

5 Claims, 26 Drawing Sheets

(56) References Cited

U.S. PATENT DOCUMENTS

| | | | | |
|---|---|---|---|---|
| 6,447,272 | B2* | 9/2002 | Tsuchiya | H02K 1/28 310/40 R |
| 6,713,907 | B2* | 3/2004 | Matsumoto | F04D 25/0613 310/254.1 |
| 7,083,387 | B2* | 8/2006 | Chen | F04D 29/325 416/189 |
| 7,442,005 | B2* | 10/2008 | Yeh | F04D 19/002 310/401 |
| 9,074,603 | B2* | 7/2015 | Wu | F04D 17/16 |
| 2004/0136842 | A1* | 7/2004 | Obara | F04D 29/057 417/354 |
| 2009/0021087 | A1* | 1/2009 | Kitamura | H02K 1/187 310/43 |
| 2009/0047148 | A1* | 2/2009 | Chen | F04D 29/056 417/354 |

\* cited by examiner

V–V

FAN MOTOR LEAD WIRE PROTECTION MEMBER

BACKGROUND OF THE INVENTION

1. Field of the Invention

The present invention relates to a protection configuration for a lead wire of a fan motor.

2. Description of the Related Art

One end of a lead wire of a fan motor is connected to a circuit board and another end of the lead wire is connected to an external power supply, such that electric power is supplied to the fan motor. When a lead wire is led out to the outside via a base of a fan motor, the lead wire is fixed to the base. In particular, if the base is made of a metallic material and if the inner peripheral edge of the base contacting the lead wire is sharp, the insulating film of the lead wire is easily damaged. This may lead to a decrease in the insulating property of the lead wire and may possibly cause disconnection of the lead wire. For example, Japanese Patent Application Publication No. 2009-050136 discloses a fan motor 1 shown in FIG. 1. The fan motor 1 includes a metal base 2 having a hole 3 through which a lead wire (not shown) is led out. However, if the inner edge of the hole 3 is sharp, the lead wire is easily damaged and disconnection of the lead wire may possibly occur.

A demand has existed for a configuration of a fan motor capable of protecting a lead wire.

SUMMARY OF THE INVENTION

In accordance with a preferred embodiment of the present invention, a fan motor includes a stationary portion; a rotary portion; and an impeller, wherein the rotary portion is configured to rotate about a center axis with respect to the stationary portion through a bearing mechanism, the impeller is configured to rotate together with the rotary portion, the stationary portion includes an armature including a coil positioned around the center axis, a metal base plate arranged below the armature, and a circuit board located above or below the base plate and provided with a lead wire electrically connected to the outside, and the base plate and the lead wire are isolated from each other by a protection member.

By installing the protection member between the metal base plate and the lead wire, the lead wire is prevented from making direct contact with the inner peripheral edge of the metal base plate. According to the present preferred embodiment, the lead wire is fixed and is not damaged or is hardly damaged. This makes it possible to prevent disconnection of the lead wire. Thus, the reliability of the fan motor is improved.

The above and other elements, features, steps, characteristics and advantages of the present invention will become more apparent from the following detailed description of the preferred embodiments of the present invention with reference to the attached drawings.

DETAILED DESCRIPTION OF THE PREFERRED EMBODIMENTS

Illustrative preferred embodiments of the present invention will now be described with reference to the drawings. The preferred embodiments and the drawings to be described below are nothing more than examples and are not intended to limit the present invention.

In the subject application, the direction extending along the center axis O-O' of the fan motor will be referred to as "axial". The direction perpendicular or substantially perpendicular to the center axis O-O' of the fan motor will be referred to as "radial". The circumferential direction centered at the center axis O-O' of the fan motor will be referred to as "circumferential". The side of an impeller in the axial direction will be referred to as "upward". The side of a base plate in the axial direction will be referred to as "downward". The direction going toward the center axis O-O' in the radial direction will be referred to as "inward". The direction going away from the center axis O-O' in the radial direction will be referred to as "outward".

Figure 1:
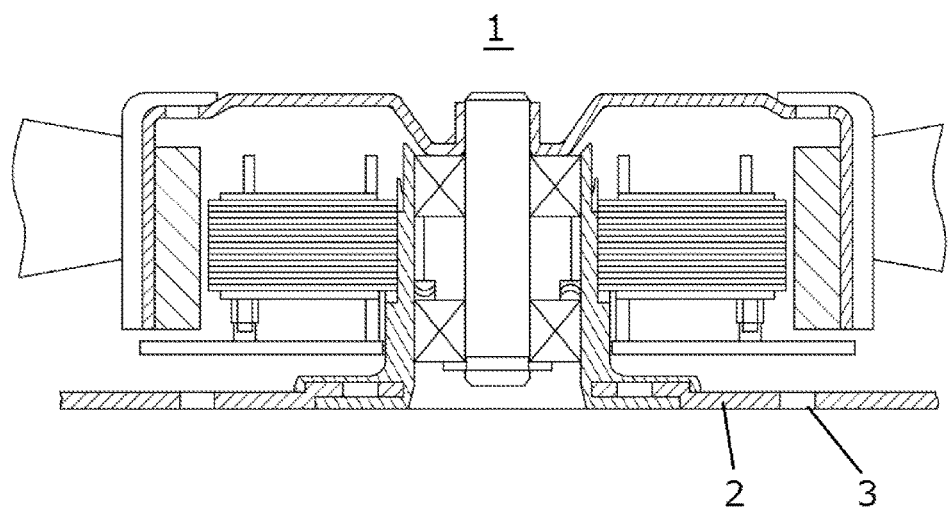
FIG. 1 is a sectional view of a conventional fan motor.
Figure 2:
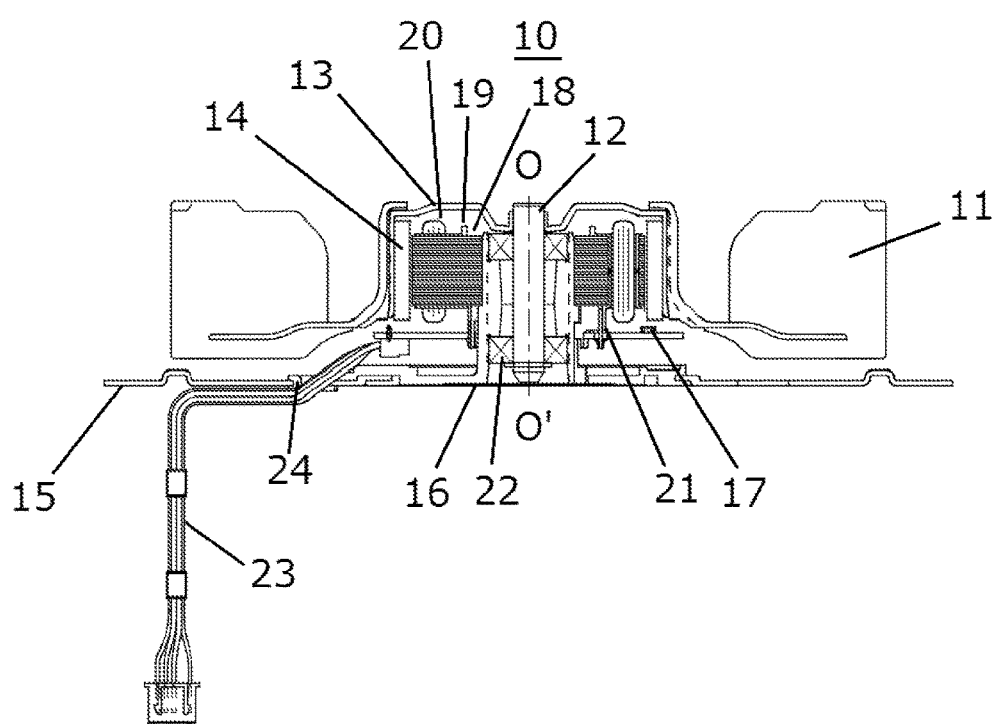
FIG. 2 is a sectional view of a fan motor according to a first preferred embodiment of the present invention.

FIG. 2 is a sectional view of a fan motor according to a first preferred embodiment of the present invention. The fan motor 10 preferably includes a stationary portion, a rotary portion, and an impeller 11. The rotary portion preferably includes a shaft 12, a cup-shaped rotor holder 13, and a rotor magnet 14 connected to the inner circumferential surface of the sidewall of the rotor holder 13. The stationary portion preferably includes an armature, a metal base plate 15 arranged below the armature, a bearing holder portion 16 connected to the base plate 15, and a circuit board 17 located above the base plate 15. The armature preferably includes a core 18, an insulator 19, and a coil 20 wound around the core 18 through the insulator 19. The coil 20 is electrically connected to the circuit board 17 by a conductor member 21. The shaft 12 is rotatably supported by a bearing mechanism 22 which is supported on the inner surface of the bearing holder portion 16. Thus, the rotary portion rotates about the center axis O-O' with respect to the stationary portion through the bearing mechanism 22. The impeller 11 is fixedly connected to the rotor holder 13 and rotates together with the rotary portion.

Figure 3:
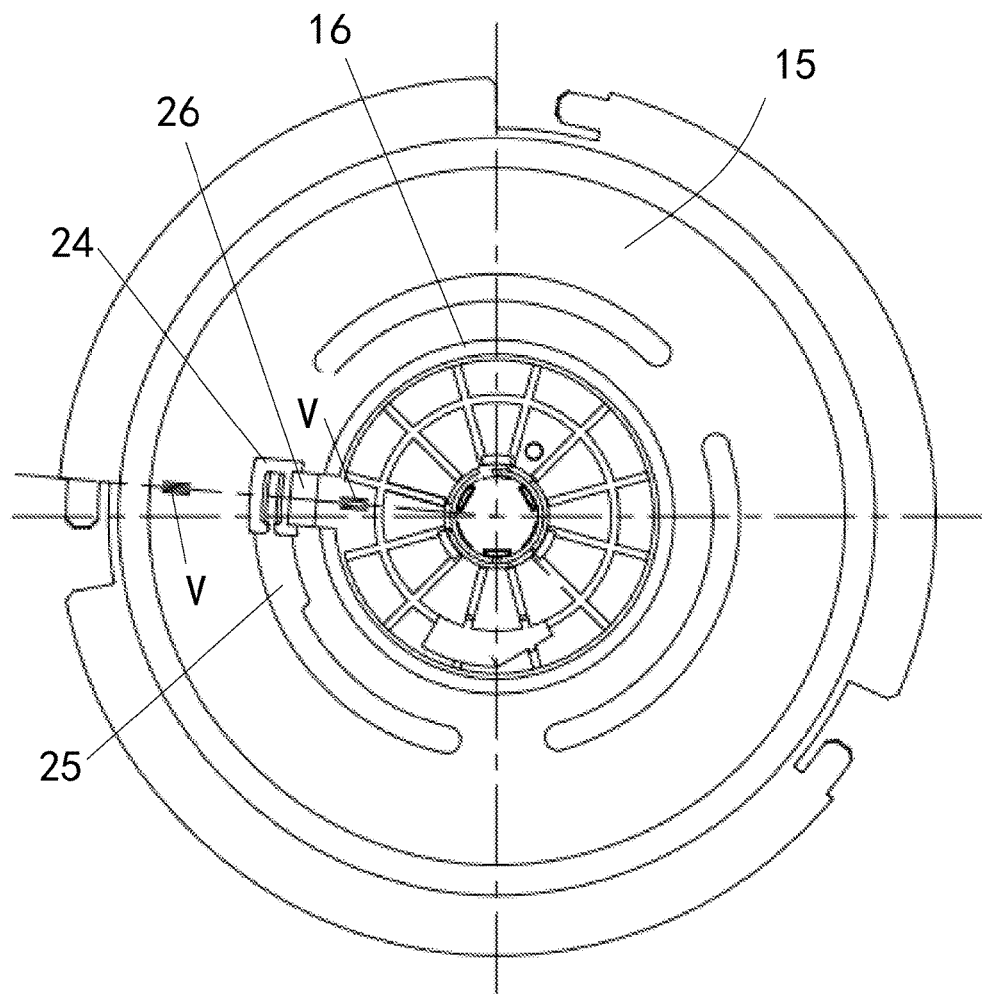
FIG. 3 is a top view of the fan motor shown in FIG. 2.
Figure 4:
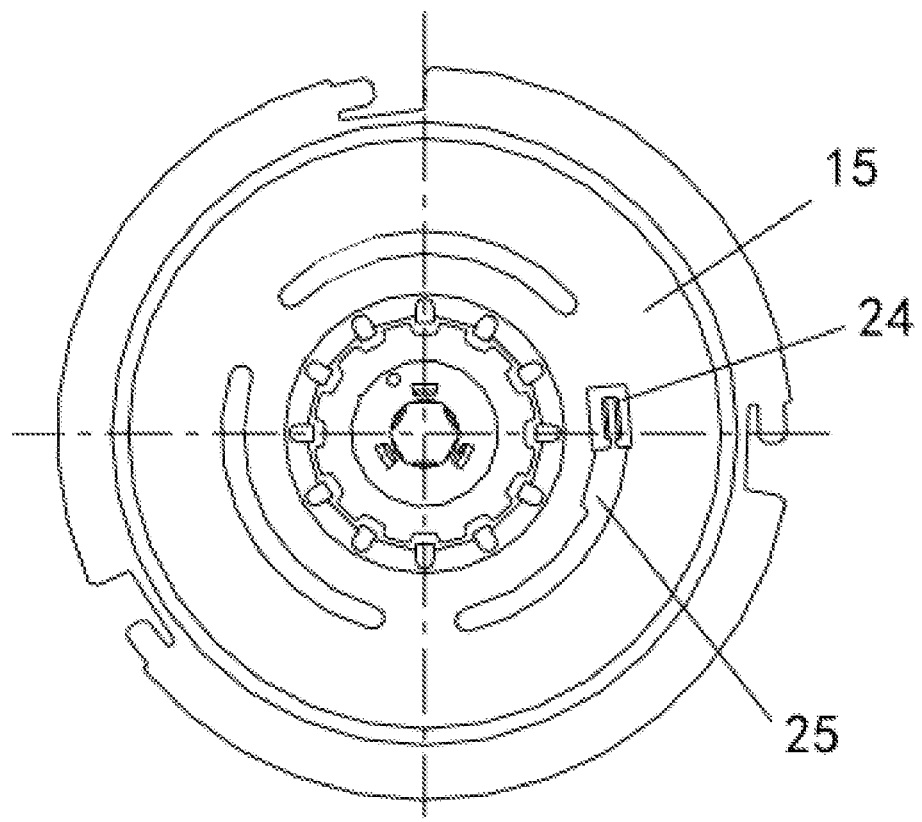
FIG. 4 is a bottom view of the fan motor shown in FIG. 2.
Figure 5:
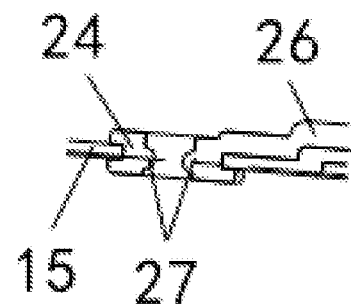
FIG. 5 is a sectional view taken along line V-V in FIG. 3.

FIG. 3 is a top view of the fan motor shown in FIG. 2. FIG. 4 is a bottom view of the fan motor shown in FIG. 2. FIG. 5 is a sectional view taken along line F-F' in FIG. 3. As shown in FIGS. 3 and 4, the base plate 15 preferably includes an opening 25 extending therethrough along the direction of the center axis O-O'. A lead wire 23 (see FIG. 2) is positioned near the opening 25. A protection member 24 is configured to cover a portion of the opening 25. The protection member 24 is preferably formed by, for example, insert-molding. This makes it easy to manufacture the fan motor. In case where the base plate 15 shown in FIG. 2 is positioned below the circuit board 17, the lead wire 23 is led out from below the opening 25. The base plate 15 may be positioned above the circuit board 17. In this case, the lead wire 23 may be led out from above the opening 25. Preferably, the protection member 24 and the bearing holder portion 16 may be one-piece formed together as a single monolithic member. The one-piece formation makes it possible to efficiently manufacture the fan motor. As shown in FIGS. 3 and 5, the protection member and the bearing holder portion 16 are preferably interconnected and unified by an intermediate portion 26. Alternatively, the protection member 24 and the bearing holder portion 16 may be formed independently of each other. In FIG. 5, there is shown an example of a preferred embodiment in which the protection member 24 includes curved surfaces 27 protruding radially outward and radially inward.

Figure 6A:
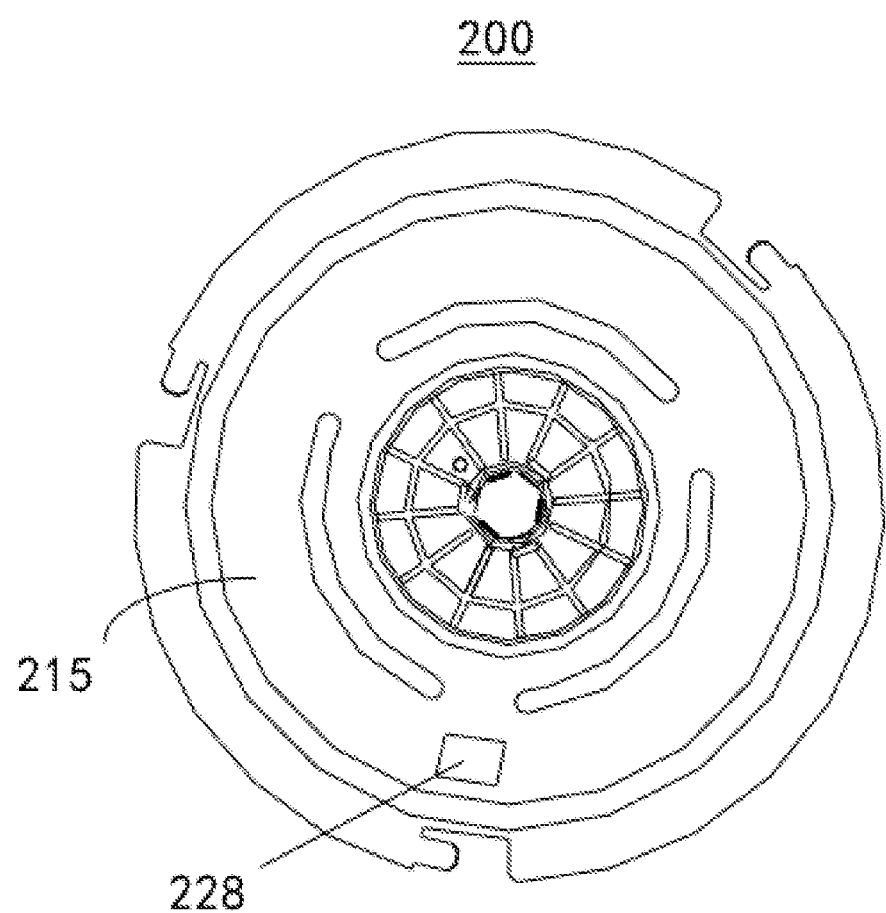
FIG. 6A is a top view of a fan motor according to a second preferred embodiment of the present invention.
Figure 6B:
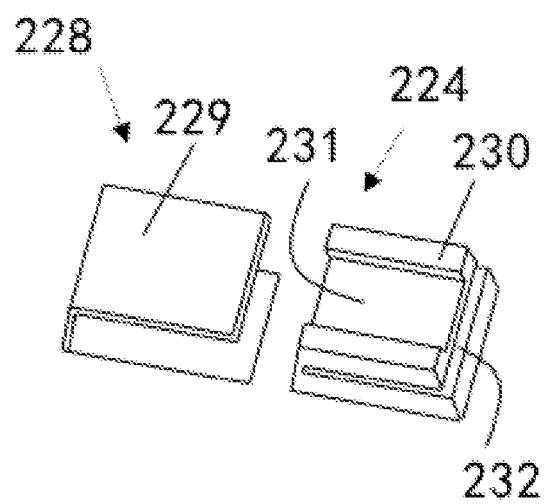
FIG. 6B is a perspective view showing a protection member fixing portion of a base plate and a protection member in the fan motor according to the second preferred embodiment of the present invention.
Figure 6C:
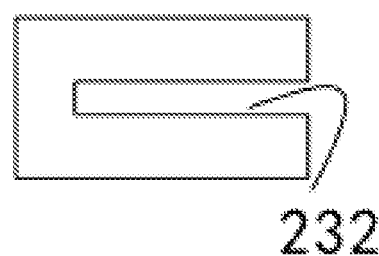
FIG. 6C is a side view of a modified example of the protection member shown in FIG. 6B.

FIG. 6A is a top view of a fan motor 200 according to a second preferred embodiment of the present invention. The second embodiment preferably differs from the first embodiment in that a protection member is fixed to a protection member fixing portion 228 of a base plate 215. FIG. 6B is a perspective view showing the protection member fixing portion of the base plate and the protection member in the fan motor according to the second preferred embodiment. FIG. 6C is a side view of a modified example of the protection member shown in FIG. 6B. As shown in FIG. 6B, the protection member fixing portion 228 is preferably erected by cutting out a portion 229 of the base plate 215 and pressing the portion 229 of the base plate 215. A protection member 224 preferably includes a rectangular or substantially rectangular body 230. A recess 231 into which the portion 229 of the base plate 215 is inserted is provided on the upper surface of the body 230. A horizontal cut groove 232 is provided on the side surface of the body 230, such that an axial restraint portion configured to restrain the lead wire 23 in the axial direction is provided.

Figure 6D:
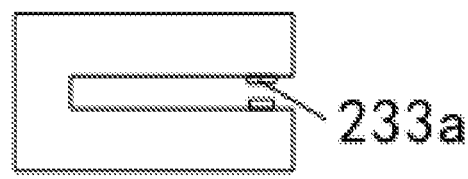
FIG. 6D is a side view of another modified example of the protection member shown in FIG. 6B.
Figure 6E:
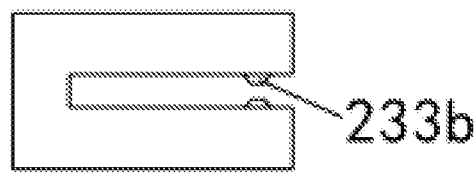
FIG. 6E is a side view of a further modified example of the protection member shown in FIG. 6B.

FIG. 6D is a side view of a modified example of the protection member shown in FIG. 6B. Projections 233a facing each other are preferably respectively provided on the upper and lower surfaces of a horizontal cut groove 232 of a protection member 224a in order to prevent the lead wire 23 from being removed from the horizontal cut groove 232. The lead wire 23 is inserted into a gap between the projections 233a. The cross section of the projections 233a preferably may be rectangular or substantially rectangular, for example. FIG. 6E is a side view of another modified example of the protection member shown in FIG. 6B. Projections 233b facing each other are respectively provided on the upper and lower surfaces of a horizontal cut groove 232 of a protection member 224b in order to prevent the lead wire 23 from being removed from the horizontal cut groove 232. The lead wire 23 is inserted into a gap between the projections 233b. The cross section of the projections 233b may preferably be trapezoidal or substantially trapezoidal, for example. Alternatively, the cross section of the projections 233b may preferably be semicircular or substantially semicircular, for example.

Figure 7A:
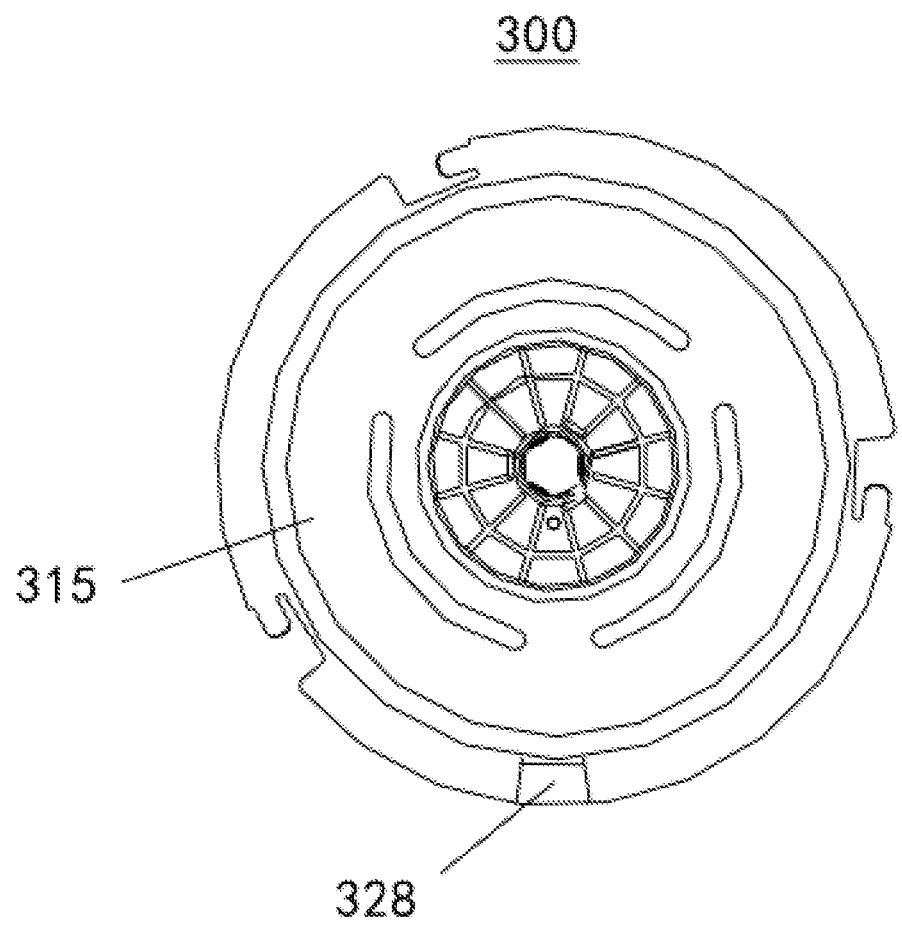
FIG. 7A is a top view of a fan motor according to a third preferred embodiment of the present invention.
Figure 7B:
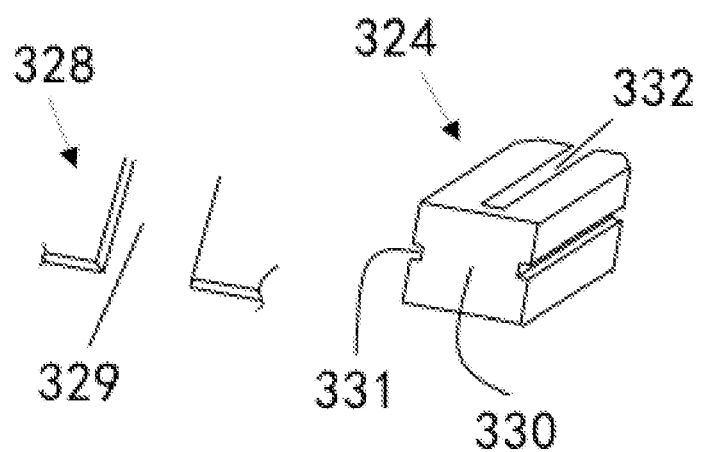
FIG. 7B is a perspective view showing a protection member fixing portion of a base plate and a protection member in the fan motor according to the third preferred embodiment of the present invention.
Figure 7C:
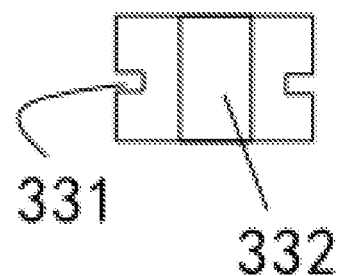
FIG. 7C is a top view of the protection member shown in FIG. 7B.

FIG. 7A is a top view of a fan motor 300 according to a third preferred embodiment of the present invention. In the third preferred embodiment, a protection member fixing portion 328 includes a cutout 329 which is preferably formed by cutting the outer peripheral portion of a base plate 315 radially inward. FIG. 7B is a perspective view showing the protection member fixing portion of the base plate 315 and a protection member in the fan motor according to the third preferred embodiment. FIG. 7C is a top view of the protection member shown in FIG. 7B. A protection member 324 preferably includes a rectangular or substantially rectangular body 330. Grooves 331 are arranged on the opposite side surfaces of the body 330. The protection member 324 is fitted to the cutout 329. The body 330 is provided with an axially-extending cut groove 332, such that a circumferential restraint portion for restraining the lead wire 23 in the circumferential direction is formed.

Figure 7D:
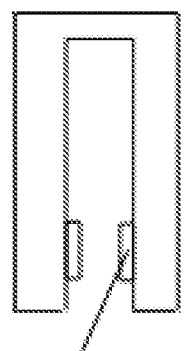
FIG. 7D is a top view of a modified example of the protection member shown in FIG. 7B.
Figure 7E:
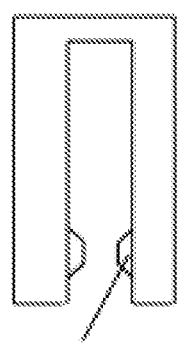
FIG. 7E is a top view of another modified example of the protection member shown in FIG. 7B.

FIG. 7D is a top view of a modified example of the protection member shown in FIG. 7B. On the mutually-facing surfaces of a cut groove 332 of a protection member 324a, there are respectively provided projections 333a configured to prevent the lead wire 23 from being removed from the cut groove 332. The lead wire 23 is inserted into a gap between the projections 333a. The cross section of the projections 333a may preferably be rectangular or substantially rectangular, for example. FIG. 7E is a top view of another modified example of the protection member shown in FIG. 7B. As shown in FIG. 7E, projections 333b facing each other are respectively provided on the mutually-facing surfaces of a cut groove 332 of a protection member 324b in order to prevent the lead wire 23 from being removed from the cut groove 332. The lead wire 23 is inserted into a gap between the projections 333b. The cross section of the projections 333b preferably may be trapezoidal or substantially trapezoidal, for example. Alternatively, the cross section of the projections 333b may be semicircular or substantially semicircular, for example.

Figure 8A:
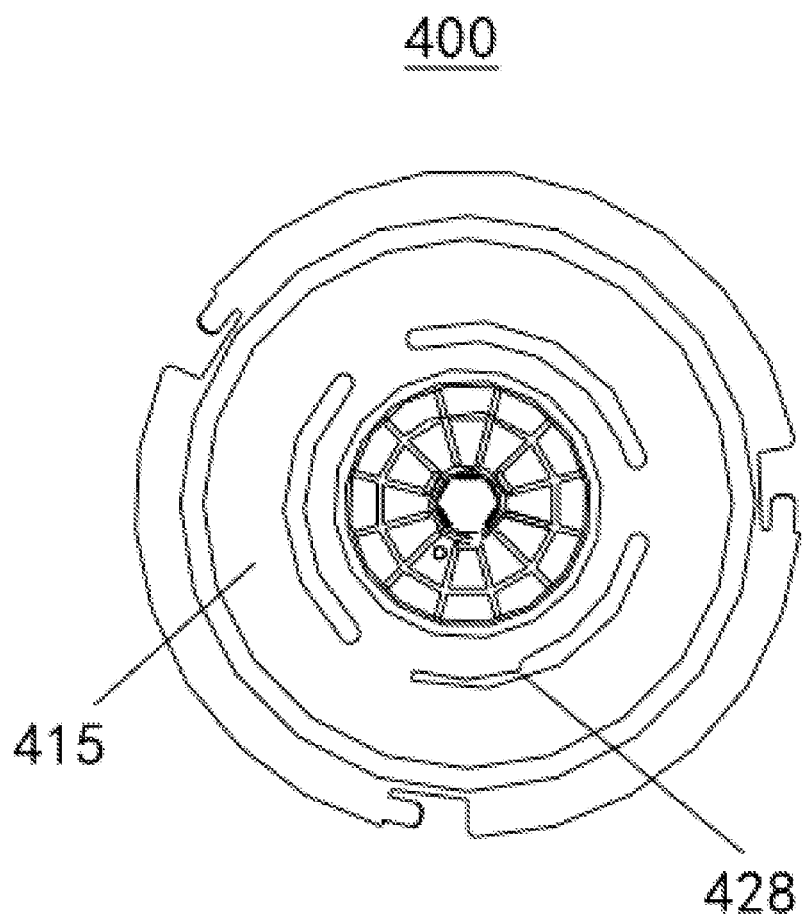
FIG. 8A is a top view of a fan motor according to a fourth preferred embodiment of the present invention.
Figure 8B:
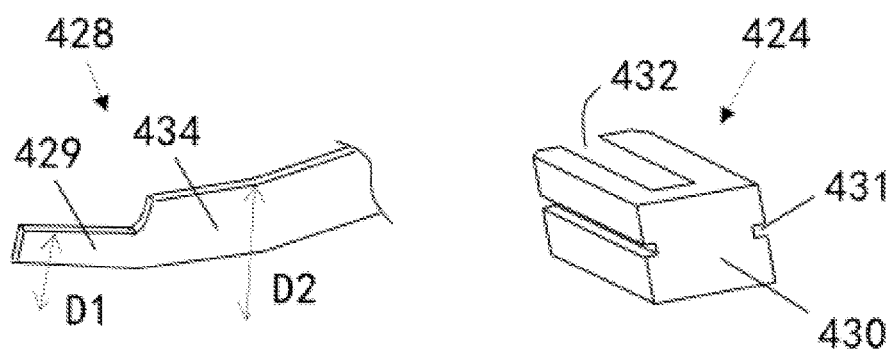
FIG. 8B is a perspective view showing a protection member fixing portion of a base plate and a protection member in the fan motor according to the fourth preferred embodiment of the present invention.
Figure 8C:
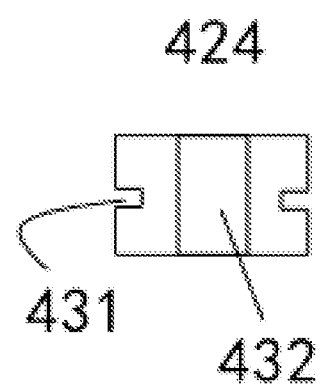
FIG. 8C is a top view of the protection member shown in FIG. 8B.

FIG. 8A is a top view of a fan motor 400 according to a fourth preferred embodiment of the present invention. FIG. 8B is a perspective view showing a protection member fixing portion of a base plate and a protection member in the fan motor according to the fourth preferred embodiment. FIG. 8C is a top view of the protection member shown in FIG. 8B. A protection member fixing portion 428 of a base plate 415 includes a first hole 429 and a second hole 434 which are provided to circumferentially communicate with each other in the base plate 415. The radial width D2 of the second hole 434 is larger than the radial width D1 of the first hole 429. The protection member 424 includes a rectangular or substantially rectangular body 430. Grooves 431 are arranged on the opposite side surfaces of the body 430 and are fitted to the first hole 429. An axially-extending cut groove 432 is provided in the body 430, such that a circumferential restraint portion configured to restrain the lead wire 23 in the circumferential direction is provided. The radial width of the second hole 434 is larger than the radial width of the body 430.

Figure 8D:
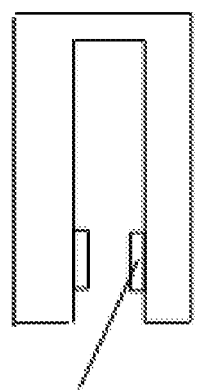
FIG. 8D shows a modified example of the protection member shown in FIG. 8B.
Figure 8E:
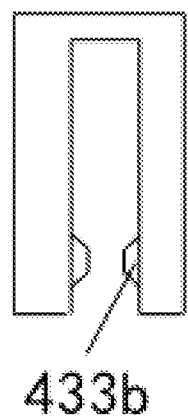
FIG. 8E shows another modified example of the protection member shown in FIG. 8B.

FIG. 8D shows a modified example of the protection member shown in FIG. 8B. Projections 433a facing each other are preferably respectively provided on the mutually-facing surfaces of a cut groove 432 of a protection member 424a in order to prevent the lead wire 23 from being removed from the cut groove 432. The lead wire 23 is inserted into a gap between the projections 433a. The cross section of the projections 433a may be rectangular or substantially rectangular, for example. FIG. 8E shows another modified example of the protection member shown in FIG. 8B. As shown in FIG. 8E, projections 433b facing each other are preferably respectively provided on the mutually-facing surfaces of a cut groove 432 of a protection member 424b in order to prevent the lead wire 23 from being removed from the cut groove 432. The lead wire 23 is inserted into a gap between the projections 433b. The cross section of the projections 433b preferably may be trapezoidal or may be semicircular, for example.

Figure 9A:
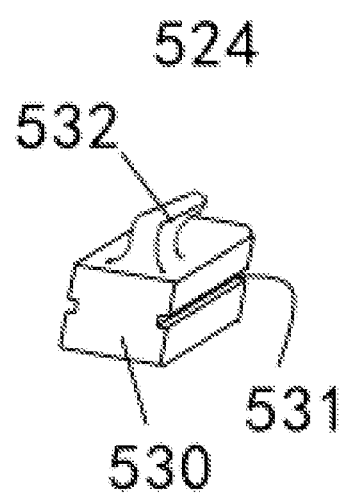
FIG. 9A is a perspective view of a protection member of a fan motor according to a fifth preferred embodiment of the present invention.

FIG. 9A is a perspective view of a protection member of a fan motor according to a fifth preferred embodiment of the present invention. The method of fixing the protection member of the fifth preferred embodiment is preferably the same as the fixing method of the third preferred embodiment or the fourth preferred embodiment. That is to say, the cutout provided in the outer peripheral edge of the of the base plate of the third preferred embodiment or the inner peripheral edge of the first hole provided in the base plate of the fourth preferred embodiment so as to communicate with the second hole becomes a protection member fixing portion. A protection member 524 includes a body 530. Grooves 531 are preferably provided on the opposite side surfaces of the body 530. The grooves 531 are fitted to the cutout or the inner peripheral edge of the first hole. The protection member 524 preferably includes a hook member 532 arranged on the upper surface of the body 530, such that an axial restraint portion configured to restrain the lead wire 23 in the axial direction is provided. In case of using the protection member fixing portion of the fourth preferred embodiment, the radial width of the second hole is preferably configured to accommodate at least the body 530.

Figure 9B:
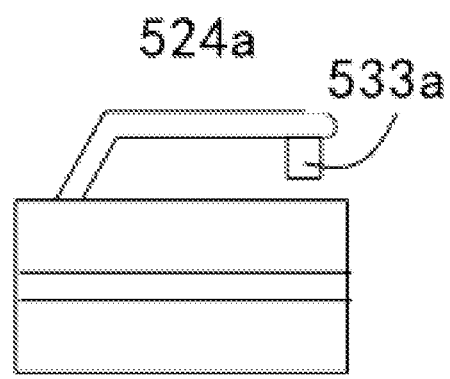
FIG. 9B is a side view of a modified example of the protection member shown in FIG. 9A.
Figure 9C:
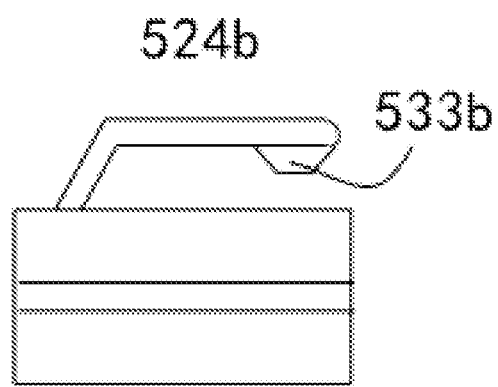
FIG. 9C is a side view of another modified example of the protection member shown in FIG. 9A.

FIG. 9B is a side view of a modified example of the protection member shown in FIG. 9A. A projection 533a is preferably provided on the lower surface of a hook member 532 of a protection member 524a in order to prevent the lead wire 23 from being removed from the hook member 532. The lead wire 23 is inserted into a gap between the projection 533a and the upper surface of the body 530. The cross section of the projection 533a preferably may be rectangular or substantially rectangular, for example. FIG. 9C is a side view of another modified example of the protection member shown in FIG. 9A. A projection 533b is preferably provided on the lower surface of a hook member 532 of a protection member 524b in order to prevent the lead wire 23 from being removed from the hook member 532. The lead wire 23 is inserted into a gap between the projection 533b and the upper surface of the body 530. The cross section of the projection 533b may preferably be trapezoidal or substantially trapezoidal, for example. Alternatively, the cross section of the projection 533b may preferably be semicircular or substantially semicircular, for example.

Figure 10A:
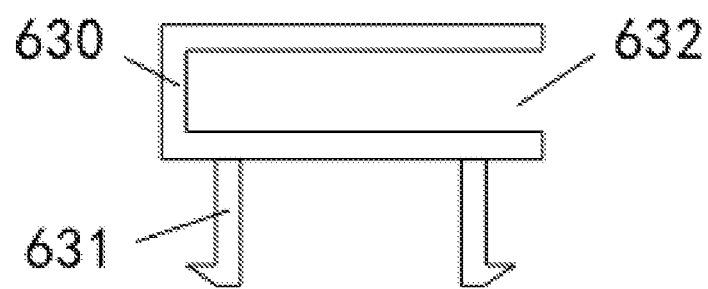
FIG. 10A is a side view of a protection member of a fan motor according to a sixth preferred embodiment of the present invention.

FIG. 10A is a side view of a protection member of a fan motor according to a sixth preferred embodiment of the present invention. A protection member fixing portion of the sixth preferred embodiment is preferably defined by the cutout of the outer peripheral edge of the base plate included in the third preferred embodiment. A protection member 624 includes a body 630. Two hooks 631 which are configured to be fixed to the protection member fixing portion are preferably arranged on the lower surface of the body 630. A cut groove 632 is provided on the side surface of the body 630, such that an axial restraint portion configured to restrain the lead wire 23 in the axial direction is provided. Alternatively, the hooks 631 may be arranged on the upper surface of the body 630.

Figure 10B:
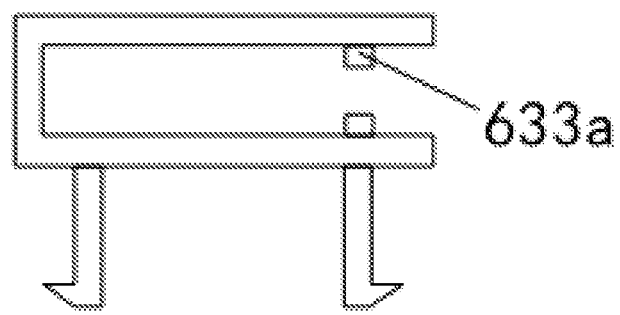
FIG. 10B is a side view of a modified example of the protection member shown in FIG. 10A.
Figure 10C:
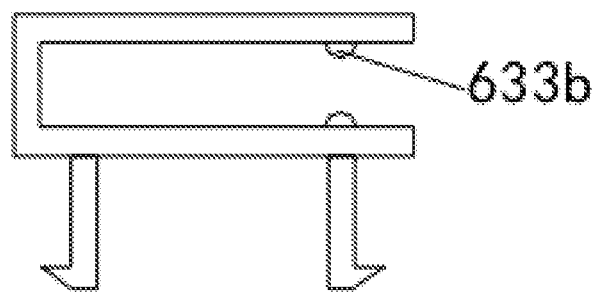
FIG. 10C is a side view of another modified example of the protection member shown in FIG. 10A.

FIG. 10B is a side view of a modified example of the protection member shown in FIG. 10A. As shown in FIG. 10B, projections 633a facing each other are preferably respectively provided on the mutually-facing surfaces of a cut groove 632 of a protection member 624a. The projections 633a are configured to prevent the lead wire 23 from being removed from the cut groove 632. The lead wire 23 is inserted into a gap between the projections 633a. The cross section of the projections 633a preferably may be rectangular or substantially rectangular, for example. FIG. 10C is a side view of another modified example of the protection member shown in FIG. 10A. As shown in FIG. 10C, projections 633b facing each other are preferably respectively provided on the mutually-facing surfaces of a cut groove 632 of a protection member 624b. The projections 633b are configured to prevent the lead wire 23 from being removed from the cut groove 632. The lead wire 23 is inserted into a gap between the projections 633b. The cross section of the projections 633b may preferably be rectangular or substantially rectangular, for example. Alternatively, the cross section of the projections 633b may preferably be semicircular or substantially semicircular, for example.

The protection members of the fan motors according to the second to sixth preferred embodiments preferably are formed independently of the base plate.

The present invention is not limited to the preferred embodiments described above. The respective elements appearing in the preferred embodiments and the modified examples described above may be appropriately combined unless a conflict arises.

The preferred embodiments of the present invention and modifications thereof further provide the following effects.

The protection member is preferably made of a resin, for example. The resin is an insulating material and is suitable for injection molding.

The base plate includes an opening which extends through the base plate along the center axis. The lead wire is positioned near the opening. The protection member covers a portion of the opening. The protection member is preferably formed by insert molding, for example. This makes it easy to manufacture the protection member.

The lead wire is led out from above or below the opening. Due to the unequal arrangement of the base plate, it becomes easy to lead out the lead wire 23.

The stationary portion includes the bearing holder portion configured to hold the bearing mechanism. The bearing holder portion and the protection member are preferably one-piece formed with each other to define a single monolithic member. This makes it easy to form the bearing holder portion and the protection member.

The protection member preferably includes the curved surface protruding radially outward or radially inward. This makes it possible to prevent the lead wire 23 from being damaged or from being disconnected.

The base plate preferably includes the protection member fixing portion. The protection member is fixed to the protection member fixing portion. The protection member includes the circumferential restraint portion configured to restrain the lead wire in the circumferential direction or the axial restraint portion configured to restrain the lead wire in the axial direction. The protection member is detachably attached to the protection member fixing portion.

The protection member fixing portion is preferably formed by cutting and erecting a portion of the base plate. The protection member includes the body. The recess into which a portion of the base plate is inserted is provided on the upper or lower surface of the body. The cut grooves are provided on the side surfaces of the body. The axial restraint portion is preferably provided in the protection member. This makes it possible to prevent the lead wire from being damaged or from being disconnected.

The cutout is preferably formed as the protection member fixing portion by cutting the outer peripheral edge of the back plate. The protection member includes the body. The grooves are provided on the opposite side surfaces of the body. The body has the axially-extending cut groove. Thus, the circumferential restraint portion is formed. This makes it possible to prevent the lead wire from being damaged or from being disconnected.

The first hole and the second hole circumferentially communicating with the first hole are provided in the base plate. The radial width of the second hole is larger than the radial width of the first hole. The protection member fixing portion is defined by the inner peripheral edge of the first hole. The protection member includes the body. The grooves are provided on the opposite side surfaces of the body. The body includes the axially-extending cut groove. Thus, the circumferential restraint portion is formed. The radial width of the second hole is set so as to accommodate at least the body. This makes it possible to prevent the lead wire from being damaged or from being disconnected.

The cutout is preferably formed by cutting the outer peripheral edge of the base plate is provided as the protection member fixing portion. The protection member includes the body. The grooves to be fitted to the cutout are formed on the opposite side surfaces of the body. The protection member includes the hook member arranged on the upper or lower surface of the body. Thus, the axial restraint portion is formed. This makes it possible to prevent the lead wire from being damaged or from being disconnected.

The first hole and the second hole circumferentially communicating with the first hole are provided in the base plate. The radial width of the second hole is larger than the radial width of the first hole. The protection member includes the body. The grooves are formed on the opposite side surfaces of the body. The protection member includes the hook member arranged on the upper or lower surface of the body. Thus, the axial restraint portion is formed. The radial width of the second hole is set so as to accommodate at least the body. This makes it possible to prevent the lead wire from being damaged or from being disconnected.

The cutout formed by cutting the outer peripheral edge of the base plate is provided as the protection member fixing portion. The protection member includes the body. Two hooks are provided on the upper or lower surface of the body. The cut grooves are provided on the side surfaces of the body. Thus, the axial restraint portion is formed. The preferred embodiments of the present invention prevent the lead wire from being damaged or from being disconnected.

While preferred embodiments of the present invention and modifications thereof have been described above, it is to be understood that variations and modifications will be apparent to those skilled in the art without departing from the scope and spirit of the present invention. The scope of the present invention, therefore, is to be determined solely by the following claims.

What is claimed is:

1. A centrifugal fan motor, comprising:
   a stationary portion;
   a rotary portion; and
   an impeller; wherein
   the rotary portion is configured to rotate about a center axis with respect to the stationary portion through a bearing mechanism;
   the impeller is configured to rotate together with the rotary portion; wherein
   the stationary portion includes an armature including a coil positioned around the center axis, a metal base plate arranged below the armature, and a circuit board located above or below the metal base plate and provided with a lead wire electrically connected to the outside;
   the metal base plate and the lead wire are isolated from each other by a protection member;
   the protection member is made of a resin;
   the metal base plate includes an opening extending therethrough along the center axis, the opening being defined by a through hole with a periphery which is completely encompassed by portions of the metal base plate, the lead wire is positioned directly adjacent to the opening, and the protection member is insert molded to encapsulate and cover a portion of the opening;
   the stationary portion further includes a bearing holder portion configured to hold the bearing mechanism, the bearing holder portion and the protection member are integral with each other so as to define a single monolithic member;
   the protection member includes a concave portion at the opening of the metal base plate, the concave portion opens directly towards a circumferential direction about the center axis; and
   the lead wire is positioned between opposed wall surfaces of the opening of the metal base pate which define the concave portion and extends axially inside the concave portion from an uppermost side of the metal base plate to a lowermost side of the metal base plate.

2. The centrifugal fan motor of claim 1, wherein the protection member includes a curved surface protruding radially outward or radially inward.

3. The centrifugal fan motor of claim 1, wherein the lead wire extends directly through the opening.

4. The centrifugal fan motor of claim 1, wherein the opening is spaced away from and non-overlapping with the center axis about which the rotary portion rotates.

5. The centrifugal fan motor of claim 1, wherein the impeller generates a circumferential airflow.

* * * * *